(12) United States Patent
Yoshihama

(10) Patent No.: US 7,995,229 B2
(45) Date of Patent: Aug. 9, 2011

(54) IMAGE PROCESSING DEVICE, INFORMATION MANAGEMENT DEVICE, INFORMATION MANAGEMENT SYSTEM, AND INFORMATION MANAGEMENT METHOD

(75) Inventor: Maki Yoshihama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1140 days.

(21) Appl. No.: 11/790,363

(22) Filed: Apr. 25, 2007

(65) Prior Publication Data

US 2007/0279684 A1 Dec. 6, 2007

(30) Foreign Application Priority Data

May 2, 2006 (JP) .................................. 2006-128552

(51) Int. Cl.
*G06F 3/12* (2006.01)
*G06K 15/00* (2006.01)
(52) U.S. Cl. ...... 358/1.15; 358/1.2; 358/1.14; 358/1.16; 358/1.17; 358/1.18
(58) Field of Classification Search ........ 358/1.11–1.18, 358/1.2
See application file for complete search history.

(56) References Cited

U.S. PATENT DOCUMENTS

| | | | |
|---|---|---|---|
| 2002/0105658 A1* | 8/2002 | Jackson et al. | 358/1.2 |
| 2002/0140978 A1* | 10/2002 | Urabe et al. | 358/1.16 |
| 2003/0107771 A1* | 6/2003 | Shibata | 358/3.28 |
| 2003/0217095 A1 | 11/2003 | Kitada et al. | |
| 2006/0087684 A1* | 4/2006 | Dokuni | 358/1.15 |

FOREIGN PATENT DOCUMENTS

| | | |
|---|---|---|
| JP | 04-294435 | 10/1992 |
| JP | 05-241934 | 9/1993 |
| JP | 2003-051925 | 2/2003 |
| JP | 2005-051308 | 2/2005 |
| JP | 2005-309879 | 11/2005 |

OTHER PUBLICATIONS

Office Action dated Apr. 3, 2009 issued in corresponding Chinese Application No. 200710102964.7 and English translation thereof.
Office Action dated Feb. 8, 2011 issued in corresponding Japanese Application No. 2006-128552.

* cited by examiner

*Primary Examiner* — James A Thompson
*Assistant Examiner* — Satwant K Singh
(74) *Attorney, Agent, or Firm* — Harness, Dickey & Pierce, P.L.C.

(57) ABSTRACT

An image forming device is disclosed that is able to easily deal with image data stored in plural image forming devices. The image forming device includes an image reading unit that reads image data; a storage unit that stores the image data read by the image reading unit; a printing unit that prints the image data; and an image information transmission unit that transmits at least attribute information of the image data to an information management device through a network, which manages at least the attribute information transmitted from the plural image forming devices.

11 Claims, 10 Drawing Sheets

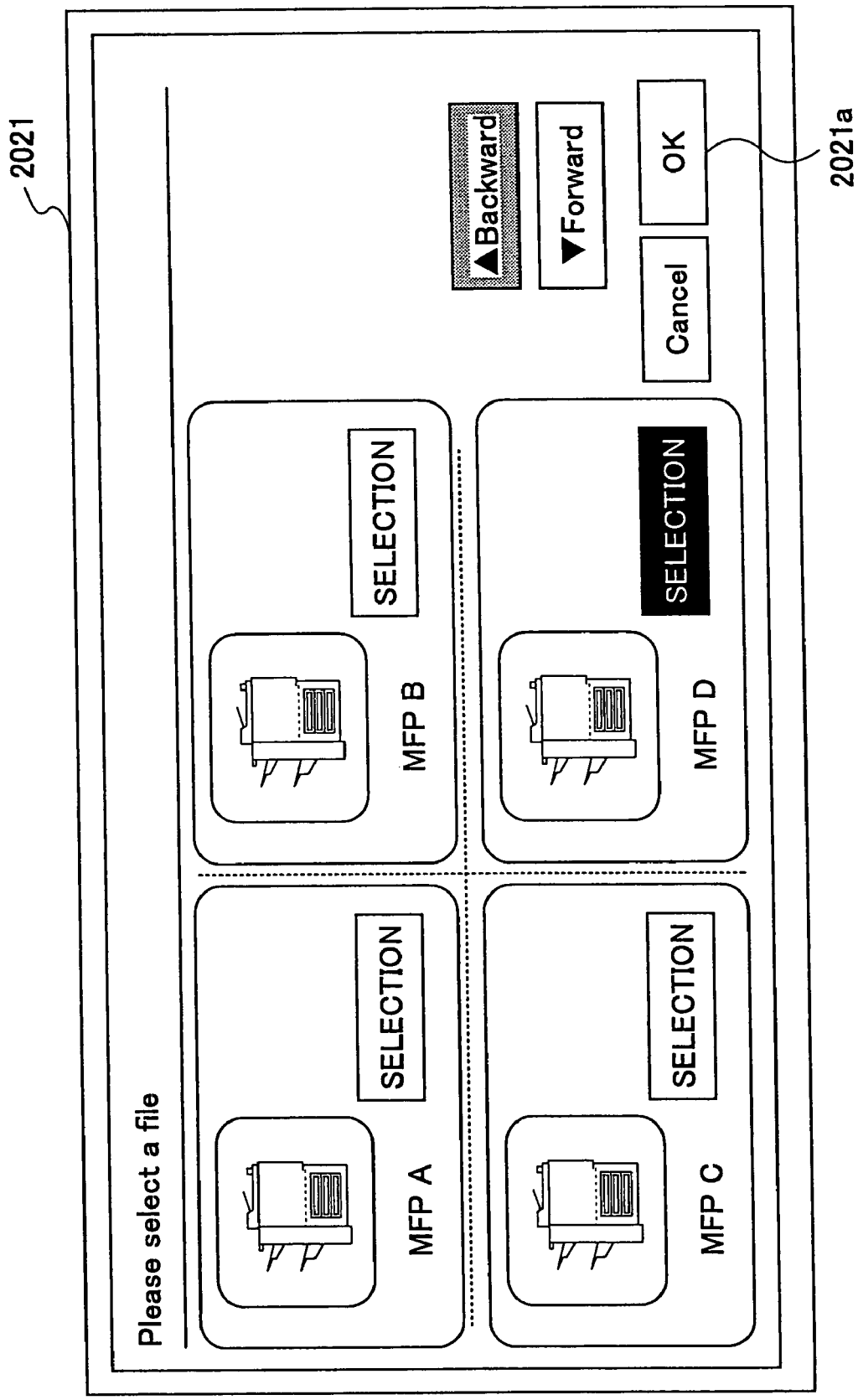

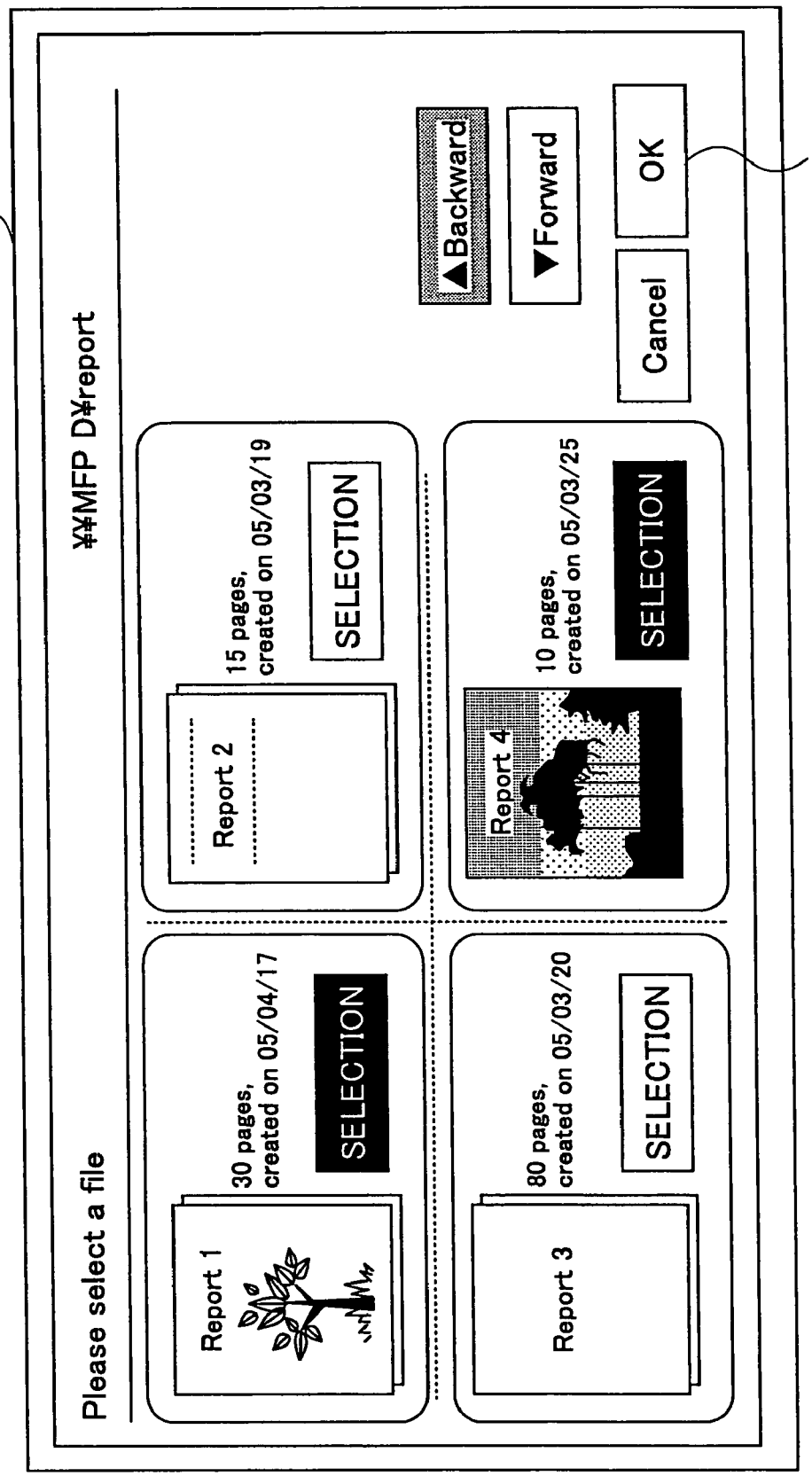

IMAGE PROCESSING DEVICE, INFORMATION MANAGEMENT DEVICE, INFORMATION MANAGEMENT SYSTEM, AND INFORMATION MANAGEMENT METHOD

BACKGROUND OF THE INVENTION

1. Field of the Invention

The present invention relates to an image processing device, information management device, information management system, and information management method, and particularly, to an image processing device including an image reading unit, an image storage unit, and a printing unit, and a relevant information management device, information management system, and information management method.

2. Description of the Related Art

In recent years and continuing, functions of a printer, a copier, a scanner, a facsimile machine, and others are incorporated into the same housing, and realize an image forming device known as a multi-function peripheral. The multi-function peripheral, although suffering from a severe limitation of memory capacity, has a central processing unit (CPU), just like a general purpose computer, and realizes the above various functions by software application control.

For example, Japanese Laid-Open Patent Application No. 2005-51308 (hereinafter, referred to as "reference 1") discloses an image forming device which has the document management function, and stores image data read when the copier or scanner function is used in a hard disk drive (HDD) of the image forming device.

The image data (documents) stored in the image forming device can be collectively displayed on an operations panel or a client personal computer (PC) through a network, and from the list of the image data a desired document can be selected.

However, in the related art, the documents managed by the image forming device are only documents read by the image forming device. Thus, when there are plural image forming devices each having the document management function in an office, a user has to access each of the image forming devices to print the desired document, and this is not convenient.

SUMMARY OF THE INVENTION

An embodiment of the present invention may solve one or more problems of the related art.

A preferred embodiment of the present invention may provide an image forming device able to easily deal with image data stored in plural image forming devices, and an information management device, an information management system, and an information management method.

According to a first aspect of the present invention, there is provided an image forming device, comprising:

an image reading unit that reads an image data;

a storage unit that stores the image data read by the image reading unit;

a printing unit that prints the image data; and an image information transmission unit that transmits at least attribute information of the image data to an information management device through a network, said information management device managing at least the attribute information transmitted from a plurality of the image forming devices.

According to a second aspect of the present invention, there is provided an information management device connected to a plurality of image forming devices through a network, each of the image forming devices including an image reading unit that reads an image data, a storage unit that stores the image data read by the image reading unit, and a printing unit that prints the image data, wherein the information management device manages at least attribute information of the image data, said attribute information being transmitted from the image forming devices.

According to the present invention, it is possible to easily deal with image data distributed and stored in plural image forming devices.

These and other objects, features, and advantages of the present invention will become more apparent from the following detailed description of preferred embodiments given with reference to the accompanying drawings.

BRIEF DESCRIPTION OF THE DRAWINGS

FIG. 6A through 6C are diagrams illustrating an example of graphic images for selecting the target document in the present embodiment;

DESCRIPTION OF THE PREFERRED EMBODIMENTS

Below, preferred embodiments of the present invention are explained with reference to the accompanying drawings.

First Embodiment

Figure 1:
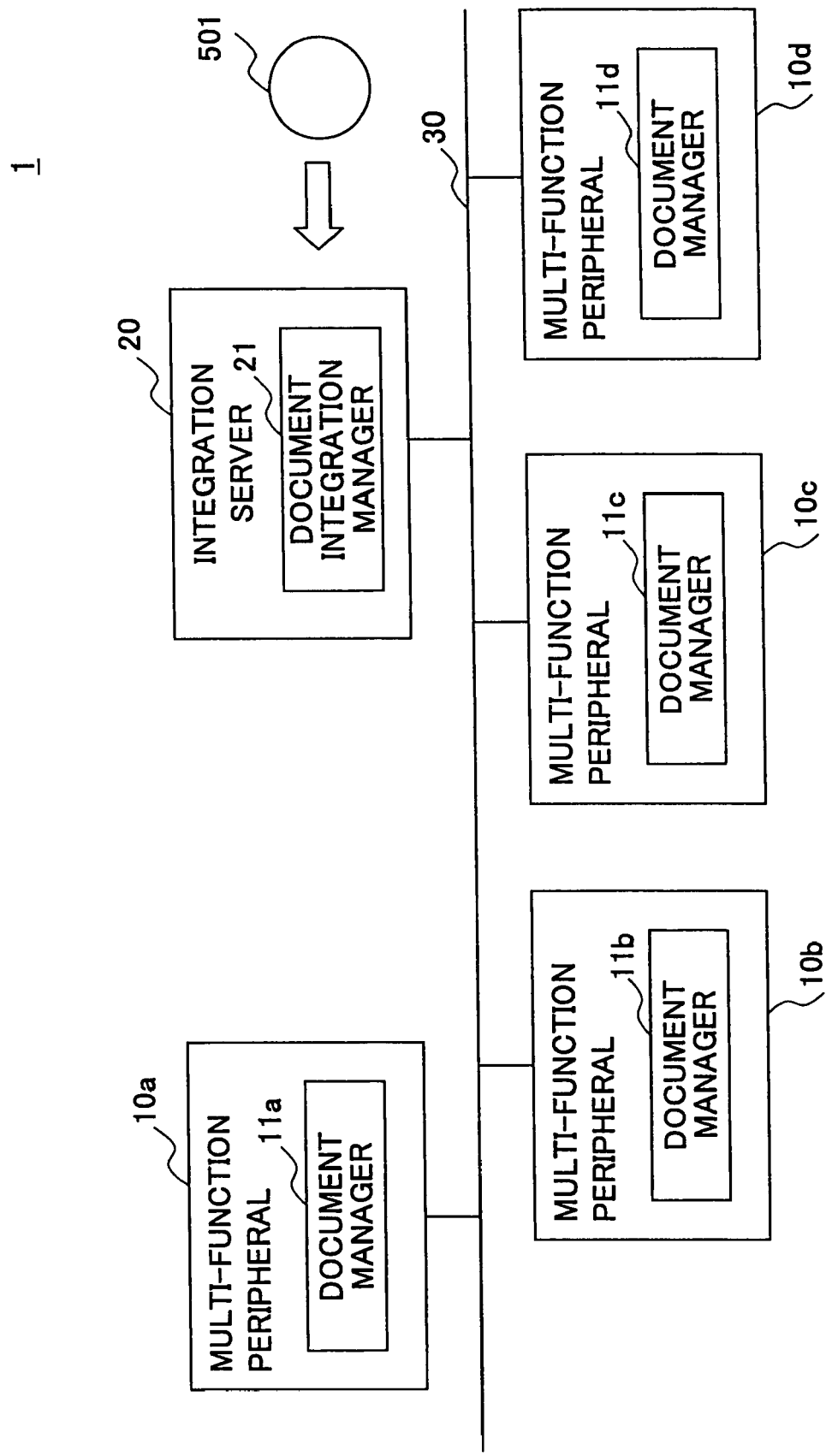
FIG. 1 is a block diagram illustrating a configuration of a document management system according to a first embodiment of the present invention.

FIG. 1 is a block diagram illustrating a configuration of a document management system according to a first embodiment of the present invention.

As shown in FIG. 1, a document management system 1 includes plural multi-function peripherals (MFP) 10a, 10b, 10c, and an integration server 20; the multi-function peripherals 10a, 10b, 10c, and 10d and the integration server 20 are connected to each other through a LAN (Local Area Network), or other cable or radio networks.

Below, the multi-function peripherals 10a, 10b, 10c, and 10d are collectively referred to as "multi-function peripherals 10" where necessary.

The multi-function peripheral 10 is an image processing device which includes multiple functions of a printer, a copier, a scanner, or a facsimile machine and others in the same housing. In the present embodiment, the multi-function peripherals 10a, 10b, 10c, and 10d include document managers 11a, 11b, 11c, 11d, respectively. Below, the document managers 11a, 11b, 11c, 11d are collectively referred to as "document managers 11" where necessary.

The document manager 11 is a program for managing image data scanned by the multi-function peripheral 10, and attribute information of the image data as well. Specifically, in each multi-function peripheral 10, by the document manager 11, the image data scanned by the multi-function peripheral 10 and the attribute information of the image data are stored in a hard disk drive (HDD) for management.

Here, the image data scanned and stored in the multi-function peripheral 10 are referred to as a "document". In addition, the document manager 11 has functions of managing the documents scanned by the multi-function peripheral 10, and functions of integratively managing the documents in the integration server 20.

Figure 2:
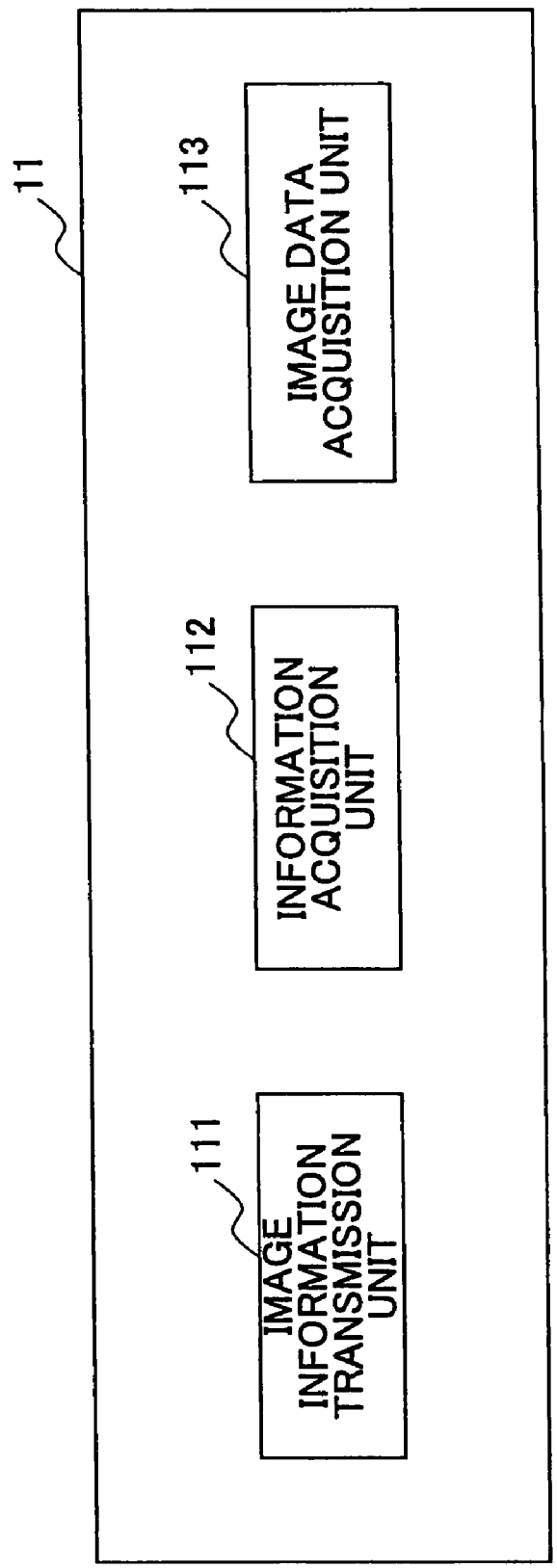
FIG. 2 is a block diagram illustrating an example of a configuration of the document manager 11.

FIG. 2 is a block diagram illustrating an example of a configuration of the document manager 11.

As shown in FIG. 2, the document manager 11 includes an image information transmission unit 111, an information acquisition unit 112, and an image data acquisition unit 113.

The image information transmission unit 111 transmits attribute information of the image data scanned by the multi-function peripheral 10 to the integration server 20.

The information acquisition unit 112 acquires at least attribute information of image data read by another image forming device from the integration server 20.

The image data acquisition unit 113 acquires at least image data read by other multi-function peripherals.

Returning to FIG. 1, the integration server 20 is a general-purpose computer, and includes a document integration manager 21. For example, the document integration manager 21 is a program installed in a recording medium 501 such as a CD-ROM, or installed in the integration server 20 through a network, and is executed by a CPU of the integration server 20; thereby, the various functions are realized in the integration server 20. For example, the integration server 20 provides an environment enabling operation of documents distributed and managed in the multi-function peripherals 10a, 10b, 10c, and 10d in an integrated way. More specifically, the integration server 20 stores the attribute information of the image data transmitted from the multi-function peripherals 10a, 10b, 10c, and 10d in the hard disk drive (HDD) of the integration server 20 for management.

Figure 3:
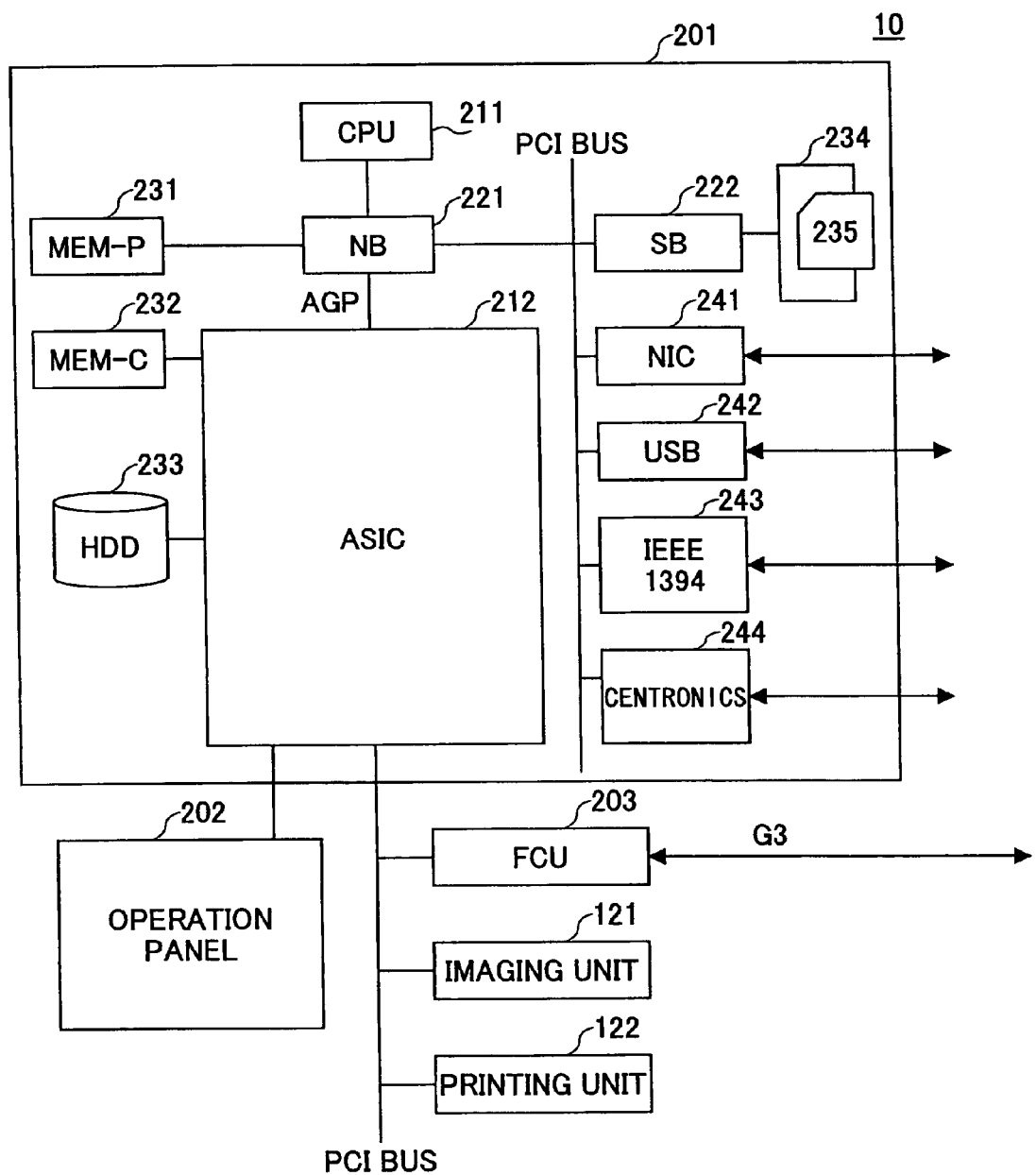
FIG. 3 is a block diagram illustrating an example of a hardware configuration of the multi-function peripheral 10 according to the first embodiment.

FIG. 3 is a block diagram illustrating an example of a hardware configuration of the multi-function peripheral 10 according to the present embodiment.

As shown in FIG. 3, the hardware system of the multi-function peripheral 10 includes a controller 201, an operations panel 202, a facsimile control unit (FCU) 203, an imaging unit 121, and a printing unit 122.

The controller 201 includes a CPU 211, an ASIC 212, a NB 221, a SB 222, a MEM-P 231, a MEM-C 232, a HDD (hard disk drive) 233, a memory card slot 234, a NIC (a network interface controller) 241, a USB device 242, an IEEE 1394 device 243, and a Centronics device 244.

The CPU 211 is an integrated circuit (IC) for various kinds of data processing.

The ASIC 212 is an integrated circuit for various kinds of image data processing.

The NB 221 is a North Bridge of the controller 201.

The SB 222 is a South Bridge of the controller 201.

The MEM-P 231 is a system memory of the multi-function peripheral 10.

The MEM-C 232 is a local memory of the multi-function peripheral 10.

The HDD 233 is a storage device of the multi-function peripheral 10.

The memory card slot 234 is a slot for inserting a memory card 235.

The NIC 241 is a controller for network communication with MAC addresses.

The USB device 242 is for providing connection terminals in compliance with the USB standard.

The IEEE 1394 device 243 is for providing connection terminals in compliance with the IEEE 1394 standard.

The Centronics device 244 is for providing connection terminals in compliance with the Centronics standard.

The operations panel 202 is a hardware operations portion serving as an input device allowing an operator to input data into the multi-function peripheral 10 and as a display device for displaying output from the multi-function peripheral 10.

In this present embodiment, for example, the programs realizing functions of the document manager 11 are stored in the MEM-C 232 and the memory card 235, and are executed by the CPU 211 to realize the functions of the document manager 11 in the multi-function peripheral 10.

Below, operations of the document management system 1 are explained.

Figure 4:
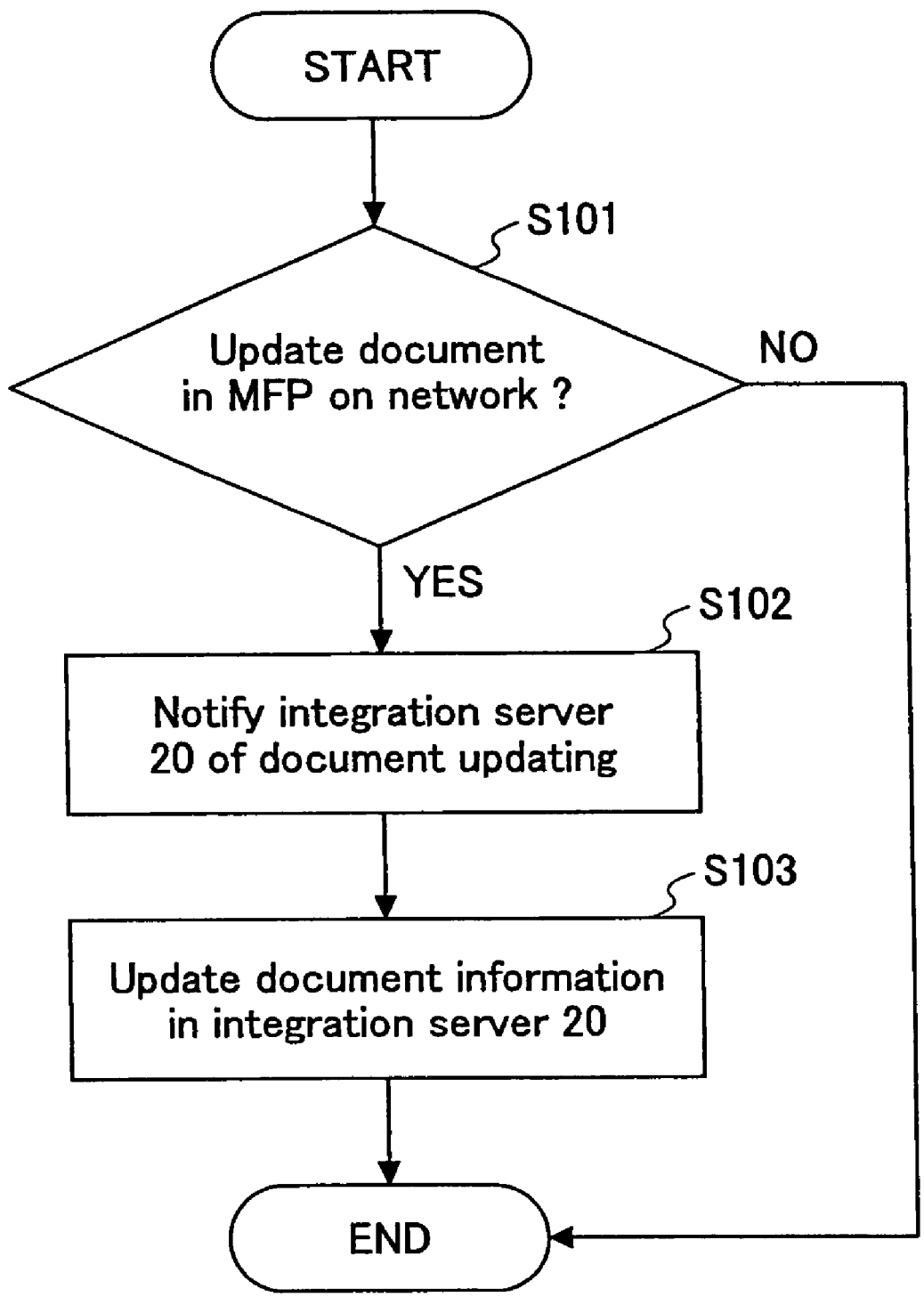
FIG. 4 is a flowchart illustrating a document registration procedure according to the first embodiment.

FIG. 4 is a flowchart illustrating a document registration procedure according to the present embodiment.

As shown in FIG. 4, in step S101, when the imaging unit 121 of any of the multi-function peripherals 10 (for example, the multi-function peripheral 10a) in the document management system 1 scans a paper document, the document manager 11a registers image data of the scanned document and attribute information of the image data in a database built in the hard-disk drive (HDD) 233 of the multi-function peripheral 10a. The attribute information of the image data includes at least a document ID for uniquely identifying the image data, or identification information such as a title of the document, and may also include paper size, image resolution, or other information. When an existing document is processed, the image data of the existing document are updated.

In step S102, the image information transmission unit 111 of the document manager 11a transmits the attribute information of the image data and identification information (for example, a host name or an IP address) of the multi-function peripheral 10a to the document integration manager 21 of the integration server 20 to notify the integration server 20 of the document registration or updating. But the image data of the document are not transmitted to the integration server 20.

In step S103, the document integration manager 21 registers the received attribute information and the identification information of the multi-function peripheral 10a in a database built in a not-illustrated hard-disk drive (HDD) of the integration server 20. Below, the attribute information of the image data and the identification information of the multi-function peripheral 10a are collectively referred to as "document information".

The document registration procedure shown in FIG. 4 is executed each time the multi-function peripherals 10 scans a manuscript, and thus, document information of the documents distributed and stored in the multi-function peripherals 10 are synchronized in the integration server 20 for management. In other words, the integration server 20 integratively manages the document information of all the documents stored in the multi-function peripherals 10 included in the document management system 1.

It should be noted that when document information stored in the document manager 11 is deleted, the multi-function peripheral 10 may inform the integration server 20 of this fact; receiving this information, the integration server 20 may delete the corresponding document information registered in the document integration manager 21. In doing so, attribute information in the integration server 20 is added or deleted corresponding to addition and deletion of image data in the multi-function peripheral 10; as a result, the image data stored in the multi-function peripheral 10 are appropriately synchronized with the attribute information managed in the integration server 20.

Below, explanations are made of operations of printing a document stored in any of the multi-function peripherals 10.

Figure 5:
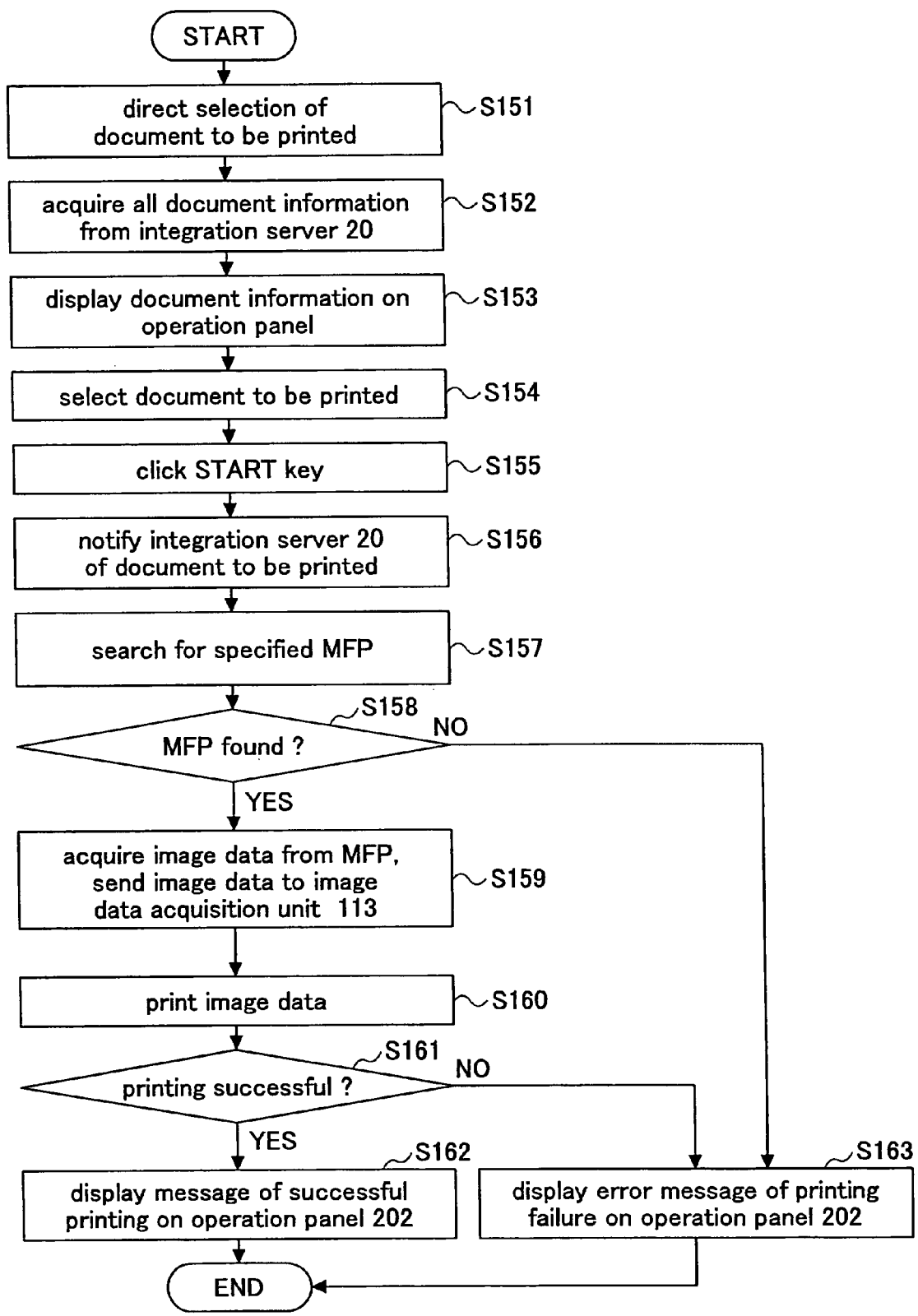
FIG. 5 is a flowchart illustrating a document printing procedure according to the first embodiment.

FIG. 5 is a flowchart illustrating a document printing procedure according to the present embodiment.

As shown in FIG. 5, in step S151, a user uses any of the multi-function peripherals 10 (for example, the multi-function peripheral 10b) in the document management system 1, and directs selection of a document to be printed (referred to as a "target document" where necessary).

In step S152, the information acquisition unit 112 of the document manager 11b acquires the document information of all the documents managed in the integration server 20. Specifically, the information acquisition unit 112 requests the document integration manager 21 of the integration server 20 to transmit the document information. In response to the request, the document integration manager 21 transmits the document information of all the documents managed in the integration server 20.

In step S153, the document manager 11b displays the obtained document information on the operations panel 202 of the multi-function peripheral 10b. For example, the document information is displayed on the operations panel 202 in the following way.

Figure 6B:
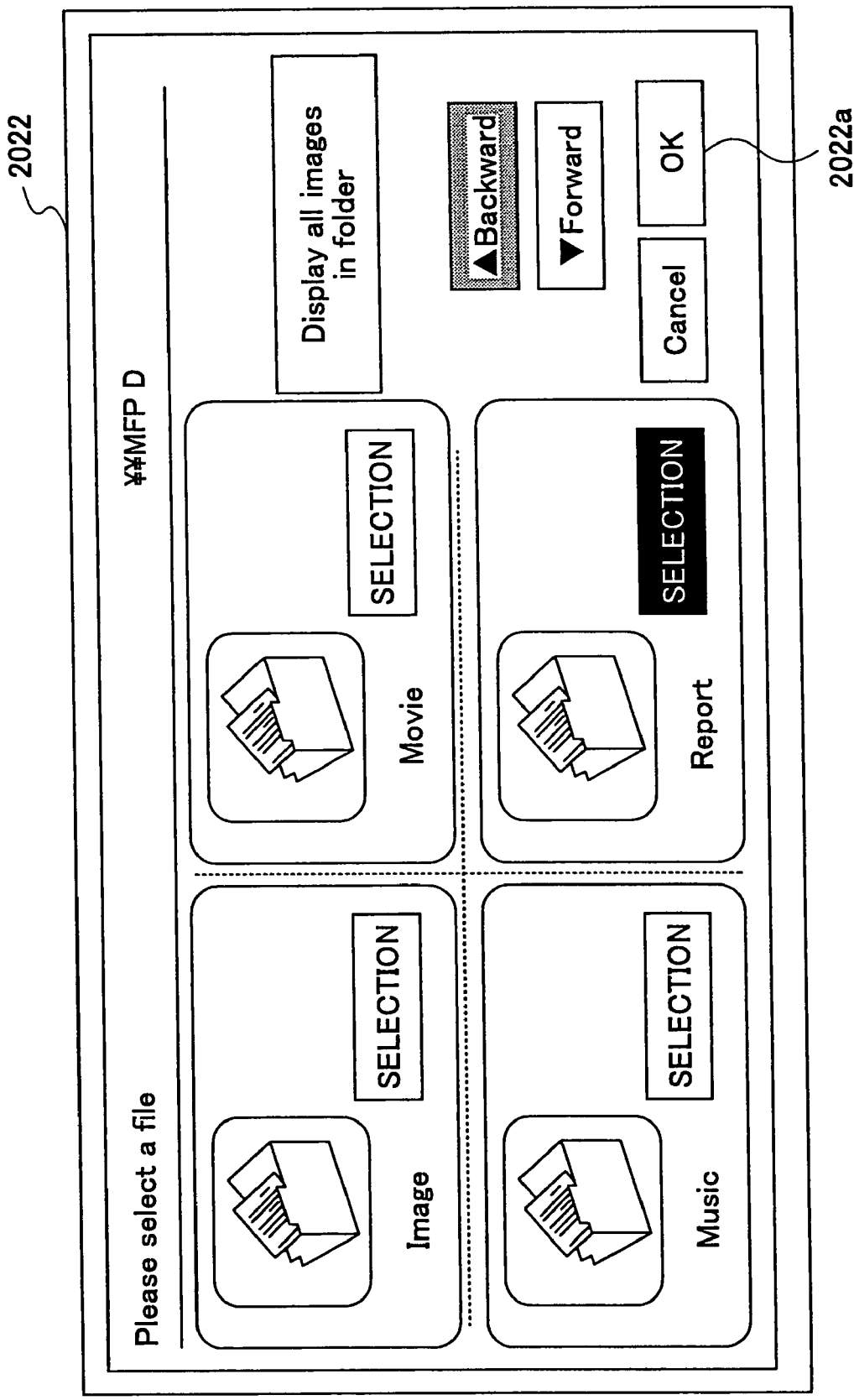

FIG. 6A through 6C are diagrams illustrating an example of graphic images (screens) for selecting the target document in the present embodiment.

As shown in FIG. 6A, a screen 2021 displays a summary of the multi-function peripherals 10 in each of which documents are stored. In the screen 2021, an icon and a selection button are presented for each of the multi-function peripherals 10; in addition, in the screen 2021, "multi-function peripheral A", "multi-function peripheral B", "multi-function peripheral C", and "multi-function peripheral D" represent the host names of the multi-function peripherals 10a, 10b, 10c, and 10d, respectively.

When the user selects any of the multi-function peripherals 10 (for example, the multi-function peripheral 10d), and clicks an OK button 2021a, a screen 2022 as shown in FIG. 6B is displayed.

As shown in FIG. 6B, the screen 2022 shows a summary of folders in the multi-function peripheral 10d. As in a general file system, the folder represents information for classifying documents into a hierarchical structure for document management. When displaying the summary of folders in the multi-function peripheral 10d on the operations panel 202 of the multi-function peripheral 10d, the attribute information of the image data transmitted to the integration server 20 from the multi-function peripheral 10d includes path information of the image data in the multi-function peripheral 10d.

When the user selects any of the folders and clicks an OK button 2022a, a screen 2023 as shown in FIG. 6C is displayed.

As shown in FIG. 6C, the screen 2023 shows a summary of documents accommodated in the selected folder as candidates for the target document. When the user selects any of the documents and clicks an OK button 2023a, the target document is determined.

By repeating the operations from the screen 2021 to the screen 2023, the user can select the target document over plural multi-function peripherals 10. It should be noted that although a user interface is illustrated in FIG. 6A through FIG. 6C which narrows the range of positions of the target document through the flow from the screen 2021 to the screen 2023 to facilitate selection of the target document, the present embodiment is not limited to this. For example, a summary of all documents in all of the multi-function peripherals 10 can be displayed.

Returning to FIG. 5, in step S154, the user selects the target document through the graphic image displayed on the operations panel 202.

In step S155, the user clicks a START key.

In step S156, the image data acquisition unit 113 of the document manager 11b notifies the document integration manager 21 of the integration server 20 of the target document. Here, the image data acquisition unit 113 of the document manager 11b at least sends identification information of the target document, such as a document ID or a document title, and identification information of the multi-function peripheral 10 in which the target document is stored, such as the host name or the IP address thereof, to the document integration manager 21 of the integration server 20.

Next, in step S157 the document integration manager 21 of the integration server 20 searches for the multi-function peripheral 10 storing the target document.

In step S158, it is determined whether the multi-function peripheral 10 is found. When the multi-function peripheral 10 is found, the routine proceeds to step S159; otherwise, the routine proceeds to step S163.

In step S159, the document integration manager 21 of the integration server 20 acquires the image data of the target document from the multi-function peripheral 10, and sends the image data to the image data acquisition unit 113.

In step S160, the document manager 11b directs the printing unit 122 of the multi-function peripheral 10b to print the obtained image data.

In step S161, it is determined whether the printing operation is successful. If the printing operation is successful, the routine proceeds to step S162, otherwise, the routine proceeds to step S163.

In step S162, a message of successful printing is displayed on the operations panel 202 of the multi-function peripheral 10b.

In step S163, an error message of a printing failure is displayed on the operations panel 202 of the multi-function peripheral 10b.

According to the present embodiment, in an environment in which documents are distributed and stored in the multi-function peripherals 10a, 10b, 10c, and 10d, it is possible to use one of the multi-function peripherals 10a, 10b, 10c, and 10d to print documents in another multi-function peripheral.

Since the actual image data of documents are not sent to the integration server 20, it is possible to reduce workload of the document registration procedure, and to remove stress of a user.

The security of the documents in different multi-function peripherals can be maintained by using security functions of the multi-function peripheral 10. Namely, when the multi-function peripheral 10 scans a manuscript, the multi-function peripheral 10 can bury a digital watermark in the image data, or encrypt the image data. By applying these security functions in the present embodiment, it is possible to maintain the security of the documents.

Second Embodiment

The configuration of a document management system of the present embodiment is basically the same as that of the previous embodiment. Below, only the differences are primarily explained.

Figure 7:
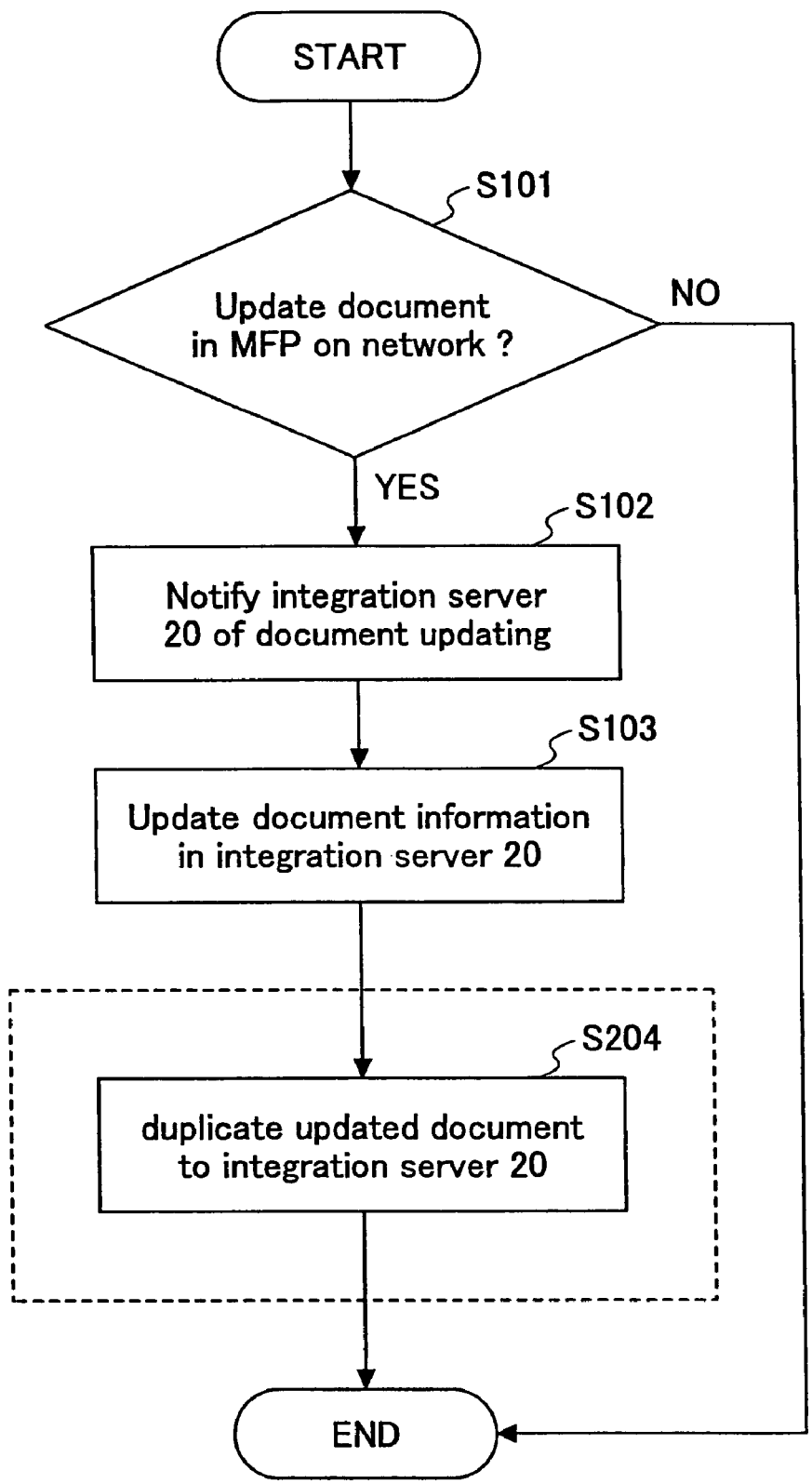
FIG. 7 is a flowchart illustrating a document registration procedure according to a second present embodiment.

FIG. 7 is a flowchart illustrating a document registration procedure according to the present embodiment.

In FIG. 7, the same reference number is assigned to the same step as those illustrated in FIG. 4, and overlapping descriptions are omitted.

As shown in FIG. 7, in step S204, the image information transmission unit 111 of the document manager 11 of the multi-function peripheral 10 transmits a copy of the image data to the document integration manager 21 of the integration server 20.

Namely, in the present embodiment, not only the attribute information, but also a copy of the image data of the document scanned by the multi-function peripheral 10 is transmitted to the integration server 20, and the attribute information and the image data are synchronized in the multi-function peripheral 10 for management.

Below, explanations are made of operations of printing a document stored in any of the multi-function peripherals 10.

Figure 8:
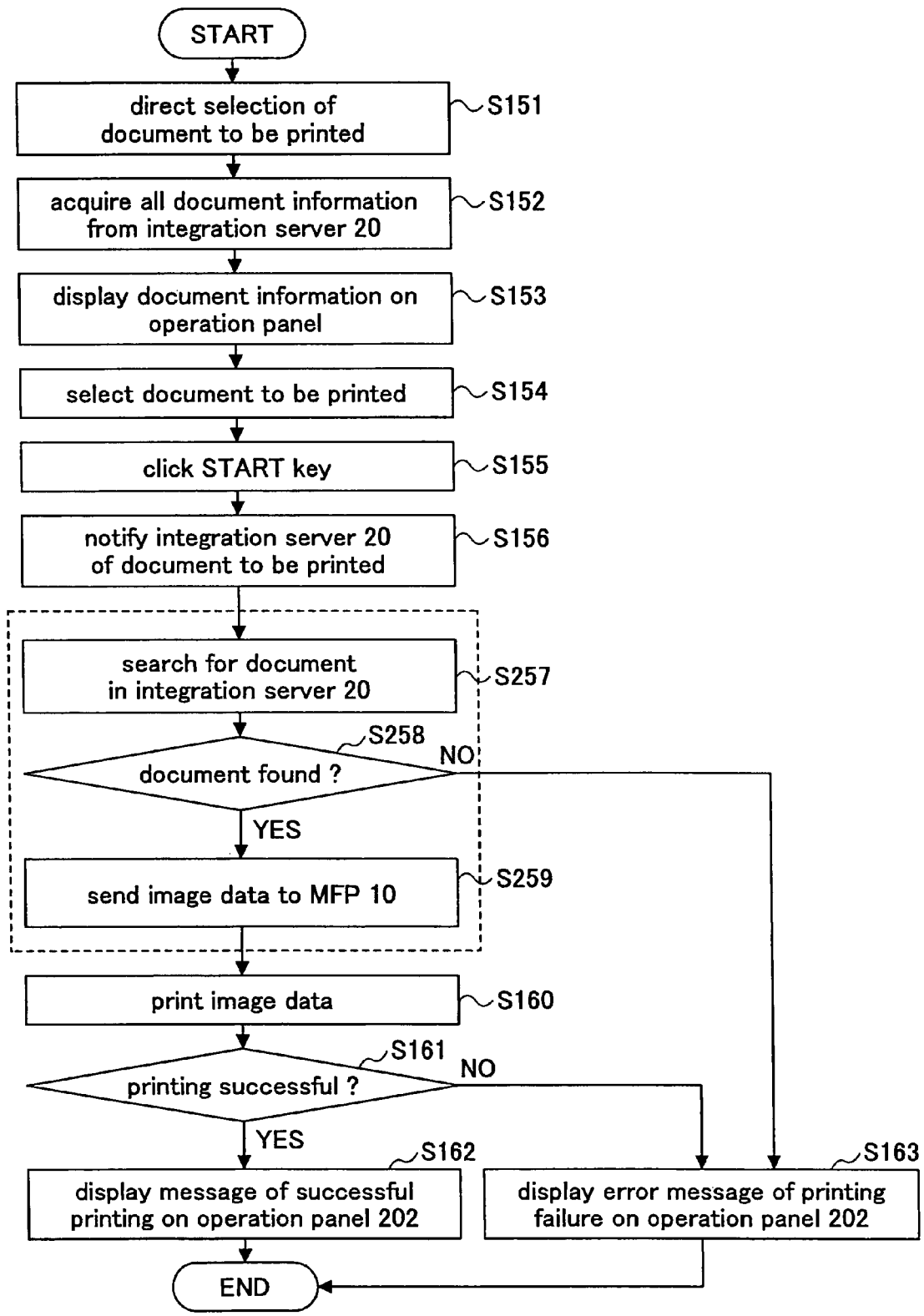
FIG. 8 is a flowchart illustrating a document printing procedure according to the second embodiment.

FIG. 8 is a flowchart illustrating a document printing procedure according to the present embodiment.

In FIG. 8, the same reference number is assigned to the same step as those illustrated in FIG. 5, and overlapping descriptions are omitted.

As shown in FIG. 8, step S157 through step S159 in FIG. 5 are replaced by step S257 through step S259.

In step S257, when the document integration manager 21 of the integration server 20 receives the identification information of the target document, based on the identification information, the document integration manager 21 of the integration server 20 searches for the target document in the database built in the hard-disk drive (HDD) of the integration server 20.

In step S258, it is determined whether the target document is found. When the target document is found, the routine proceeds to step S259; otherwise, the routine proceeds to step S163.

In step S259, the document integration manager 21 of the integration server 20 acquires the image data of the target document from the hard-disk drive (HDD) of the integration server 20, and sends the image data to the multi-function peripheral 10 (for example, the multi-function peripheral 10b), which requests the image data.

In this way, the image data of the target document stored in the integration server 20 is printed in the multi-function peripheral 10b.

According to the present embodiment, the same as the previous embodiment, in an environment in which documents are distributed and stored in the multi-function peripherals 10a, 10b, 10c, and 10d, it is possible to use one of the multi-function peripherals 10a, 10b, 10c, and 10d to print documents in another multi-function peripheral.

Particularly, in the present embodiment, the actual image data of documents are managed by the integration server 20, and the actual image data of documents are used in printing. Thus, it is possible to increase the printing speed.

In addition, since the actual image data of documents are consequently managed twofold, the redundancy of the system is improved; thus, even when one of the multi-function peripheral 10 is in trouble, it is possible to protect the data, and it is possible to print the document scanned by the one multi-function peripheral 10 in trouble.

Since the actual image data of documents are sent to the integration server 20 during the registration procedure, the registration procedure may cost some time. To solve this problem, for example, a registration completion notification may be performed before transmission of the actual image data, and the transmission of the actual image data can be performed in the background. In this way, it is possible to prevent the user having an uncomfortable feeling.

In the above embodiments, when a document to be printed is selected, if this document is stored in the multi-function peripheral 10 being operated for printing, the query to the document integration manager 21 may be omitted, and the selected document may be directly printed.

In the above embodiments, it is described that user operations are performed through the operations panel 202 of any one of the multi-function peripherals 10. Certainly, user operations can be performed on a client personal computer (PC) connected to the multi-function peripherals 10 via a network. In other words, the diagrams shown in FIG. 6A through FIG. 6C may be displayed on the client personal computer.

In addition, the integration server 20 need not be a general purpose computer, but the document integration manager 21 may be installed in each of the multi-function peripherals 10.

The present invention further includes the following embodiment.

An information management method of an image forming device including an image reading unit that reads an image data, a storage unit that stores the image data read by the image reading unit, and a printing unit that prints the image data, said method comprising the steps of:

transmitting at least attribute information of the image data read by the image reading unit to an information management device through a network; and managing at least the attribute information transmitted from a plurality of the image forming devices.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Applications No. 2006-128552 filed on May 2, 2006, the entire contents of which are hereby incorporated by reference.

What is claimed is:

1. An image forming device, comprising:
an image reading unit that reads an image data;
a storage unit that stores the image data read by the image reading unit;
a printing unit that prints the image data;
an image information transmission unit that transmits at least attribute information of the image data stored in the storage unit to an information management device through a network;
an informing unit that, when a particular image data stored in the storage unit is deleted, informs the information management device of the deletion of the particular image data;
an information acquisition unit that acquires attribute information of a second image data read by a second image forming device from the information management device; and
a control unit that causes the second image data read by the second image forming device to be displayed as a selection candidate of a document to be printed by the printing unit based on the attribute information acquired by the information acquisition unit, in addition to the image data read by the image forming device.

2. The image forming device as claimed in claim 1, wherein the selection candidate of a document to be printed is displayed on an operations panel of the image forming device.

3. The image forming device as claimed in claim 1, further comprising:
an image data acquisition unit that acquires, through the network, the image data selected from a plurality of the selection candidates,
wherein the image data are printed by the printing unit of the image forming device.

4. The image forming device as claimed in claim 3, wherein the image data acquisition unit sends a request for transmission of the selected image data to the information management device, and acquires the image data through the information management device.

5. The image forming device as claimed in claim 1, wherein
the image information transmission unit further transmits the image data to the information management device, and
the information management device manages the image data transmitted from the plurality of the image forming devices.

6. An information management device, comprising:
a document integration unit that manages attribute information of image data transmitted from one or more image forming devices connected to the information management device through a network, each of the image forming devices including an image reading unit that reads an image data, a storage unit that stores the image data read by the image reading unit, and a printing unit that prints the image data,
wherein
the document integration unit, in response to a request for attribute information from one of the image forming devices, the one of the image forming devices displaying the attribute information as selection candidates to be printed by the one of the image forming devices, sends the attribute information transmitted by the image forming devices and managed by the document integration unit, and
wherein the document integration unit, in response to being informed of deletion of an image data from one of the image forming devices, deletes corresponding attribute information managed by the document integration unit.

7. The image management device as claimed in claim 6, wherein in response to a request for transmission of the image data made by one of the image forming devices, the information management device acquires the image data from any of the image forming devices that stores the image data, and sends the image data to the one of the image forming devices that requests the transmission of the image data.

8. The image management device as claimed in claim 6, wherein the information management device further manages the image data transmitted from the image forming devices.

9. The image management device as claimed in claim 8, wherein in response to a request for transmission of the image data made by one of the image forming devices, the information management device sends the image data under management thereof to the one of the image forming devices that requests the transmission of the image data.

10. A system for managing information, the system comprising:
an image forming device configured to,
read and store image data,
transmit attribute information associated with the stored image data to an information management device,
when a particular image data stored therein is deleted, inform the information management device of the deletion of the particular image data, and
request for attribute information of image data managed by the information management device for printing, the requesting attribute information including attribute information of image data read and stored by other image forming devices and managed by the information management device; and
the information management device configured to,
manage attribute information transmitted from the image forming device and the other image forming devices;
send the attribute information managed therein in response to being requested for attribute information of image data from the image forming device, the attribute information being sent including the attribute information of image data read and stored by the other image forming devices.

11. The system as claimed in claim 10, wherein the information management device is further configured to,
receive image data together with associated attribute information from the other image forming devices, and
send the received image data to the image forming device in response to being requested for the received image data.

* * * * *